United States Patent [19]

Everett, Jr.

[11] Patent Number: 4,628,239

[45] Date of Patent: Dec. 9, 1986

[54] DUAL OPTICAL MECHANICAL POSITION TRACKER

[75] Inventor: Seth L. Everett, Jr., Lincroft, N.J.

[73] Assignee: The United States of America as represented by the Secretary of the Army, Washington, D.C.

[21] Appl. No.: 742,152

[22] Filed: Jun. 6, 1985

[51] Int. Cl.[4] ............................................. G05B 19/40
[52] U.S. Cl. ..................................... 318/685; 318/696
[58] Field of Search .............................. 318/685, 696; 250/231 SE; 340/340 P; 400/322

[56] References Cited

U.S. PATENT DOCUMENTS

| | | | |
|---|---|---|---|
| 3,304,434 | 2/1967 | Konter | 250/231 SE |
| 3,573,589 | 4/1971 | Berry | 318/601 |
| 4,114,750 | 9/1978 | Baeck et al. | 400/279 |
| 4,158,800 | 6/1979 | Jahelka et al. | 318/685 |
| 4,252,451 | 2/1981 | Clancy et al. | 400/322 X |
| 4,279,523 | 7/1981 | Ringle | 400/322 X |
| 4,349,770 | 9/1982 | Ragen | 318/685 |
| 4,362,980 | 12/1982 | Itzkowitz | 318/685 |
| 4,404,510 | 9/1983 | Nakajima | 318/696 |
| 4,429,268 | 1/1984 | Yajima | 318/696 |
| 4,496,936 | 1/1985 | Kramer | 250/231 SE X |

Primary Examiner—Bernard Roskoski
Assistant Examiner—Carl M. Bergmann
Attorney, Agent, or Firm—Sheldon Kanars; Jeremiah G. Murray; Paul A. Fattibene

[57] ABSTRACT

Apparatus for retaining control of moving carriage impact dot matrix print heads when subjected to strong external forces such as shock and/or vibration. Position and direction of carriage movement is provided by a photo emitter-sensor assembly and a slotted timing wheel or disc having a plurality of equally spaced slots whose slot width is equal to the slot separation. The slot width is sufficient to frame a pair of side-by-side emitters which operate in conjunction with a pair of side-by-side sensors on the other side of the timing wheel. The order or sequence in which the sensors receive photo energy from their respective emitters indicates the direction of rotation of the timing wheel while simultaneous reception of photo energy by the side-by-side sensors provides an indication of valid rest position of the carriage drive motor.

11 Claims, 8 Drawing Figures

DUAL OPTICAL MECHANICAL POSITION TRACKER

This invention may be manufactured and used by or for the Government for governmental purposes without the payment of any royalties thereon or therefor.

CROSS REFERENCE TO RELATED APPLICATION

This application is related to the following copending application Ser. No. 741,940, filed 6-6-85 now U.S. Pat. No. 4,600,319, entitled, "Control For Dot Matrix Printer", filed in the name of Seth L. Everett, Jr., the present inventor.

BACKGROUND OF THE INVENTION

1. Field of the Invention

This invention relates generally to impact type moving carriage printers and more particularly to such printers which are required to operate reliably in the presence of external vibration and/or shock forces.

2. Description of the Prior Art

Servo control systems for positioning a print head relative to a print medium are generally known and typically employ a coded timing wheel or disc which is secured to the shaft of a stepper motor which is used to selectively position the carriage and accordingly the print head. Typical examples of such apparatus include: U.S. Pat. No. 3,573,589, entitled, "Position Servo System For A Motor Including Detenting At Destination", which issued to J. Berry on Apr. 6, 1971; U.S. Pat. No. 4,114,750, entitled, "Printer System Having Local Control For Dynamically Alterable Printing", which issued to H. S. Baeck, et al. on Sept. 19, 1978; U.S. Pat. No. 4,158,800, entitled, "Control System" which issued to J. R. Jahelka, et al. on June 19, 1979; U.S. Pat. No. 4,349,770, entitled, "Electronic Damping System", which issued to R. A. Ragen on Sept. 14, 1982; and U.S. Pat. No. 4,362,980, entitled, "Position Error Recovery and Motor Control System", which issued to H. Itzkowitz on Dec. 7, 1982. In the last mentioned patent, the present position of a stepper drive motor in a typewriter is tracked by generating a pair of sensor signals and converting these signals to digital signals, which digital signals are constrained to change in accordance with the predetermined pattern on a step by step or increment by increment basis. If the pattern is not followed precisely, the error is detected and a correction in position information can be made.

Accordingly, it is an object of the present invention to provide an improvement in the printing apparatus.

Another object of the invention is to provide an improvement in dot matrix type of impact printers.

A further object of the invention is to provide an improvement in dot matrix printers which are capable of operating in harsh environments.

And still another object of the invention is to reposition the carriage mounted print head of a dot matrix printer following any unintentional movement which may be caused by externally generated vibration and/or shock forces.

SUMMARY

Briefly, the foregoing and other objects are achieved by apparatus for tracking the movement of a carriage mounted print head driven by means of a stepper motor. Position and direction of carriage movement is provided by a means for determining both absolute step count deviation from the last valid motor shaft position of the stepper motor as well as its direction of rotation. Position and direction of rotation information is provided by a photo emitter/sensor assembly enveloping the outer edge of a slotted timing wheel or disc having a plurality of equally spaced slots located along the outer perimeter of the timing wheel. The width of each slot is equal to the separation to the next slot and has a width sufficient to permit a pair of side by side emitters to direct photo energy therethrough simultaneously and which operate in conjunction with a pair of side by side sensors on the other side of the timing wheel. The order in which the sensors receive photo energy from their respective emitters indicates the direction of timing wheel rotation while simultaneous reception of photo energy by the pair of side by side sensors provides an indication of a valid "cogged" rest position of the stepper motor.

BRIEF DESCRIPTION OF THE DRAWINGS

While the present invention is defined in the claims annexed to and forming a part of this specification, a better understanding can be had by reference to the following description when taken in conjunction with the accompanying drawings in which:

DESCRIPTION OF THE PREFERRED EMBODIMENT

Figure 1:
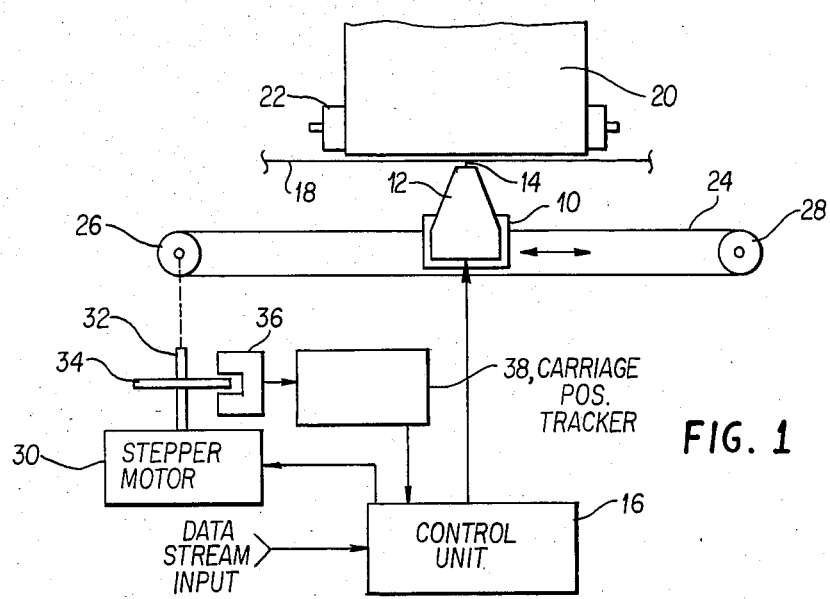
FIG. 1 is a block diagram generally illustrative of a stepper motor control system for an impact printer in accordance with the subject invention.

Referring now to the drawings and more particularly to FIG. 1, disclosed thereat is a block diagram which is generally illustrative of a position servo system for controlling the carriage of a dot matrix printer. A conventional print head 12 is mounted on the carriage 10 and includes a plurality of print wires 14 which when activated in response to a character or symbol generation signal from a control unit 16 which may be, for example, implemented by means of a microprocessor, causes a print ribbon 18 to be forced against the face of a printing medium 20. The printing medium, for example, comprises a sheet of paper or the like which is moved by means of a platen or roller 22. The roller in turn is normally rotated in accordance with a rotational drive motor, not shown, in a conventional fashion under the control of the control unit 16.

As is well known, the carriage 10 is translated back and forth across the face of the printing medium 20 by means of a belt 24 wound around a pair of pulleys 26 and 28. The belt 24 of the present invention is preferably comprised of a toothed non-slip positive belt which engages toothed elements, not shown, included on the perimeter of the pulleys 26 and 28. Further as shown in FIG. 1, pulley 26 comprises a drive pulley by being coupled to the stepper motor 30 while the other pulley 28 comprises an idler pulley.

Figure 2:
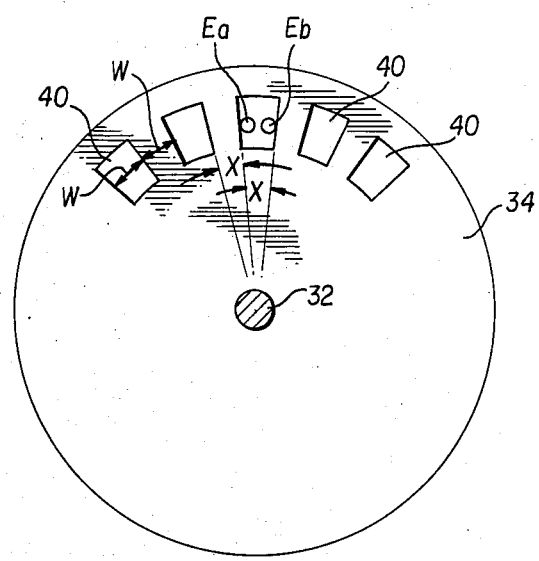
FIG. 2 is a top planar view of the slotted timing wheel included in the preferred embodiment of the invention.

The stepper motor 30 further includes a shaft 32 upon which is mounted a slotted timing wheel or disc 34, the details of which are shown in FIG. 2. The timing wheel 34 operates in conjunction with a photo emitter/sensor assembly 36. The assembly 36 is operable to generate and couple both position and direction of rotation information to a carriage position tracker circuit 38 which in turn is operable to supply information to the control unit 16 for actuating the stepper motor to reposition the carriage mounted print head 12 in the event that an external force such as shock and/or vibration overcomes the stepper motor's inherent holding power and causes the carriage mounted print head 12 to erroneously change position from a known rest print position, meaning that the stepper motor 30 is not being purposely stepped and the print head 12 is in an otherwise operative condition. Although such a system can normally provide information as to how many steps the stepper motor 30 has been rotated to position the carriage 10 at a specific location, it becomes lost if the carriage unintentionally becomes jogged away from its print position and the direction of rotation is not known, in which case the whole system must then go through time consuming reinitialization sequence to realign the print head 12 to a known position. Under repetitive vibration or shock pulse condition, even at a low repeat rate, the entire print system becomes inoperative.

This now leads to a consideration of the preferred embodiment of the invention which is directed to an improved means for providing information both as to position and direction of movement of the carriage 10 through operation of the stepper motor 30 which in turn is controlled by the control unit 16.

Referring now to FIG. 2, shown thereat are the details of the slotted timing wheel 34. The timing wheel 34 is comprised of a relatively thin circular body or disc having a plurality of equally spaced apertures or slots 40 which are located circumferentially around a common diameter towards the outer perimeter. The slots 40 define radially oriented generally rectangular openings and have a mean width W which is equal to the spacing between adjacent slots. The number of slots 40 corresponds to the number of valid "rest" positions of the driving stepper motor 30 and the shaft 32. There are no other allowable rest positions for the motor shaft 32 inasmuch as stepper motors, by design, are inherently operable to provide a magnetic cogging effect and are thus pulsed to discrete rest positions which correspond to a "step" of the stepper motor 30.

The slots 40 of the timing wheel 34 are at least a minimum width dimension W to permit a pair of photo (optical) energy emitter elements $E_a$ and $E_b$, when placed side by side, to simultaneously direct a light beam therethrough as shown in FIG. 2.

Figure 3:
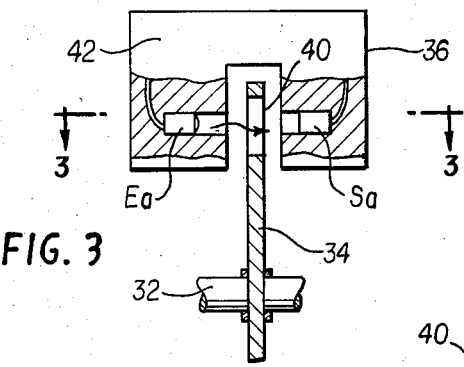
FIG. 3 is a partial cutaway view of a timing wheel and photo emitter/sensor assembly in accordance with a preferred embodiment of the invention.
Figure 4:
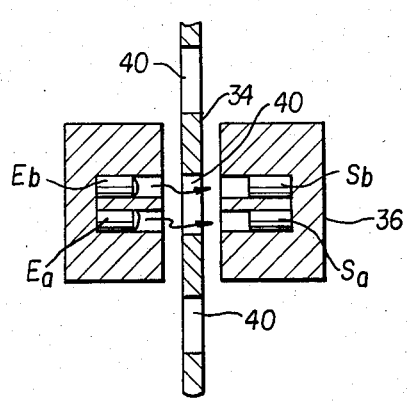
FIG. 4 is a sectional view of the assembly shown in FIG. 3 taken along the lines 3—3 thereof.

This now leads to a consideration of FIGS. 3 and 4 which are directed to the photo emitter/sensor assembly 36. The assembly 36 is comprised of a bifurcated housing 42 which, when positioned over the outer peripheral portion of the timing wheel, sequentially covers the slots 40 as the timing wheel 34 rotates. In registration with the slots 40 are mounted a pair of side by side photo emitter elements $E_a$ and $E_b$ which may be, for example, light emitting diodes (LED). The side by side placement of the emitters $E_a$ and $E_b$ are shown in FIG. 4, which depicts a top plan sectional view thereof. At the same level and in registration with the pair of side by side emitters $E_a$ and $E_b$ are a pair of side by side photo sensors $S_a$ and $S_b$ which may be, for example, photo sensitive diodes or transistors and which are located on the other side of the timing wheel 34.

Accordingly, for each valid rest position of the stepper motor 30, a respective slot 40 will permit photo emitter $E_a$ to direct a beam of light to the sensor $S_a$ as well as permitting photo emitter $E_b$ to simultaneously direct a beam of light to the sensor $S_b$. As the timing wheel 34 rotates, either in a clockwise or counterclockwise direction, the timing wheel 34 will then operate to interrupt one of the two light beams, depending upon the direction of rotation, followed by the other light beam, until both beams are interrupted and then the cycle repeats with both light beams being projected through the slot as shown, for example, in FIG. 5.

Figure 5:
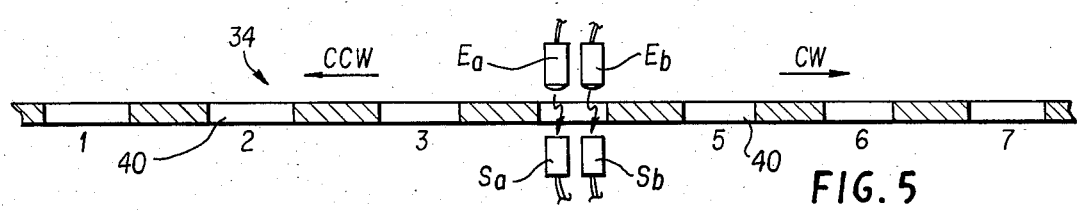
FIG. 5 is a linearized diagram helpful in understanding the operation of the subject invention.

FIG. 5 is intended to illustrate that for a clockwise rotation of the timing wheel 34, the slot number sequence of slots 40 is 7, 6, 5, 4, 3, 2, 1, etc. whereas for a counterclockwise rotation, the slot number sequence becomes 1, 2, 3, 4, 5, 6, 7, etc. It can be appreciated then from the following truth tables as well as FIGS. 6A and 6B that directional information, depending upon whether the timing wheel 34 is rotating either clockwise or counterclockwise, can be obtained from a sequence in which the light is either interrupted or passed through the slots 40 between the respective emitters $E_a$, $S_a$ and $E_b$, $S_b$.

TABLE I

CLOCKWISE ROTATION

| TIME SEQUENCE | OUTPUT E/S Pair A | OUTPUT E/S Pair B | SLOT IN VALID REST POS. | SLOT NO. |
|---|---|---|---|---|
| 0 | ON | ON | Yes | 4 |
| 1 | OFF | ON | No | — |
| 2 | OFF | OFF | No | — |
| 3 | ON | OFF | No | — |
| 4 | ON | ON | Yes | 3 |
| 5 | OFF | ON | No | — |
| 6 | OFF | OFF | No | — |
| 7 | ON | OFF | No | — |
| 8 | ON | ON | Yes | 2 |
| 9 | OFF | ON | No | — |
| 10 | OFF | OFF | No | — |
| 11 | ON | OFF | No | — |
| 12 | ON | ON | Yes | 1 |

TABLE II

COUNTERCLOCKWISE ROTATION

| TIME SEQUENCE | OUTPUT E/S Pair A | OUTPUT E/S Pair B | SLOT IN VALID REST POS. | SLOT NO. |
|---|---|---|---|---|
| 0 | ON | ON | Yes | 4 |
| 1 | ON | OFF | No | — |
| 2 | OFF | OFF | No | — |
| 3 | OFF | ON | No | — |
| 4 | ON | ON | Yes | 5 |
| 5 | ON | OFF | No | — |
| 6 | OFF | OFF | No | — |
| 7 | OFF | ON | No | — |
| 8 | ON | ON | Yes | 6 |
| 9 | ON | OFF | No | — |
| 10 | OFF | OFF | No | — |
| 11 | OFF | ON | No | — |
| 12 | ON | ON | Yes | 7 |

Furthermore, direction information resulting from external forces being exerted on the dot matrix printer of the subject invention to cause unintentional movement of the print head carriage 10 can also be derived from the sequential progression of the emitter/receptor pair output. For example, assuming that the last intentionally driven stepper motor position is indicated by slot number 4, as shown in FIG. 5, movement of the mechanical assembly including the timing wheel 34 as a result of uncontrollable vibration or shock forces result in a definite sequence of the outputs from the sensors depending upon the direction that the mechanical system was forced to move.

Figure 7:
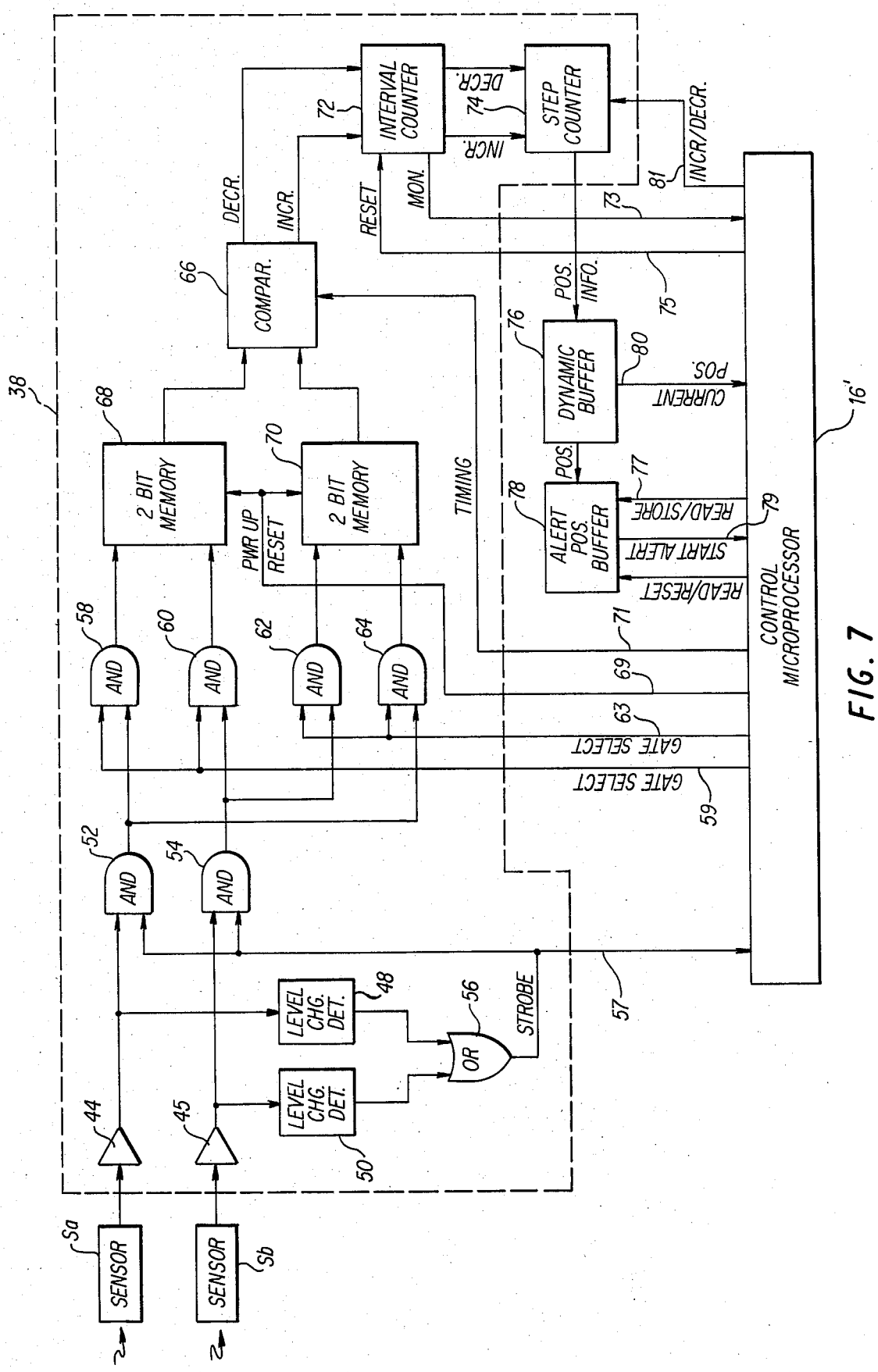
FIG. 7 is an electrical block diagram illustrative of the carriage position tracker circuitry shown in FIG. 1.

Electrical tracking of the emitter/receptor pair outputs is provided by the carriage position tracker circuit 38, the details of which are shown in FIG. 7. Referring now to FIG. 7, the sensors $S_a$ and $S_b$ are shown coupled to a pair of signal amplifiers 44 and 45 whose outputs are respectively coupled to and drive a pair of level change detectors 48 and 50 as well as providing one input to a pair of AND gates 52 and 54. Each level change detector 48 and 50 provides a pulse output upon the detection of a level change when either of the sensors $S_a$ and $S_b$ turn "on" or "off". This pulse output is applied to an OR gate 56, the output of which comprises a strobe signal to permit the next or "new" electrical state of the particular sensor $S_a$ or $S_b$ to be gated out of the AND gates 52 and 54 as well as being applied via signal bus 57 to the microprocessor 16' which is utilized to implement the control unit 16 shown in FIG. 1. The strobe signal causes the microprocessor 16' to alternately generate gate select signals for two pairs of AND gates 58, 60 and 62, 64 on signal buses 59 and 63 as well as providing a timing signal for a comparator circuit 66 on signal bus 71. The AND gates 58 and 60 have their respective outputs coupled to a first two bit memory 68 while the AND gates 62 and 64 have their outputs coupled to a second two bit memory 70. The two memories 68 and 70 can be implemented, for example, by four flip-flops each, not shown.

Assuming that a binary logic "1" or high state corresponds to the condition where a sensor $S_a$ and $S_b$ are on, i.e. receiving optical energy, while a binary "0" or low state corresponds to the off condition of the sensors, the two memories 68 and 70 are initially set to a logic "1" output state. This is provided by a power up reset signal applied from the microprocessor 16' to both memories concurrently via signal bus 69. Thereafter, the memories 68 and 70 will receive digital inputs alternately to accept new sensor signals with each strobe pulse from the OR gate 56. The memory 68 or 70 having the "older" state will be overwritten by the new electrical state of the sensors with the new and previous states being stored in the two memories 68 and 70. The logic output states of the memories 68 and 70 are compared in the comparator 66 driven by timing pulses from the microprocessor 16' appearing on signal bus 71 and an "interval" counter 72 is made to either increment or decrement in accordance with the Truth Table shown in the following Table III.

Figure 6A:
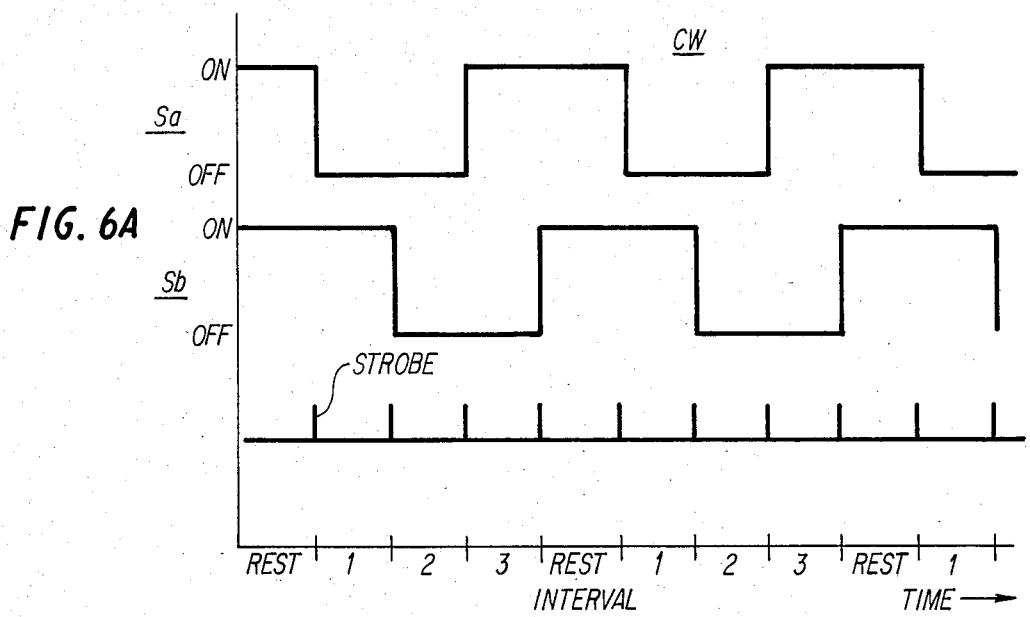
FIGS. 6A and 6B are two sets of time related waveforms further helpful in understanding the operation of the subject invention.
Figure 6B:
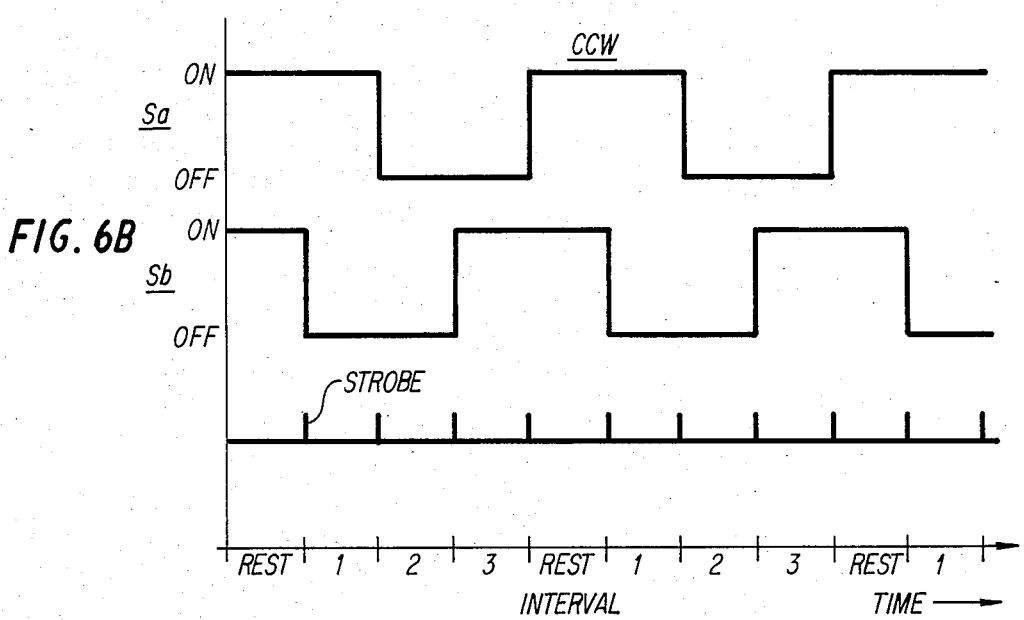

Each specific combination of the outputs of sensors $S_a$ and $S_b$ is considered to be an interval and therefore an interval exists for each strobe pulse as further shown in FIGS. 6A and 6B. The interval counter 72 is incremented if the timing wheel 34 is rotated in the clockwise (CW) direction and is decremented if it is rotating in the counterclockwise (CCW) direction. Moreover, four cumulative interval counts in either direction increments or decrements a step counter 74.

TABLE III

| SENSOR BINARY STATES | | | | Increment/Decrement of Interval Counter- 72 |
|---|---|---|---|---|
| Previous | | New | | |
| $S_a$ | $S_b$ | $S_a$ | $S_b$ | |
| 0 | 0 | 0 | 0 | No Change |
| 0 | 1 | 0 | 0 | Increment (CW) |
| 1 | 0 | 0 | 0 | Decrement (CCW) |
| 1 | 1 | 0 | 0 | Double Change |
| 0 | 0 | 0 | 1 | Decrement (CCW) |
| 0 | 1 | 0 | 1 | No Change |
| 1 | 0 | 0 | 1 | Double Change |
| 1 | 1 | 0 | 1 | Increment (CW) |
| 0 | 0 | 1 | 0 | Increment (CW) |
| 0 | 1 | 1 | 0 | Double Change |
| 1 | 0 | 1 | 0 | No Change |
| 1 | 1 | 1 | 0 | Decrement (CCW) |
| 0 | 0 | 1 | 1 | Double Change |
| 0 | 1 | 1 | 1 | Decrement (CCW) |
| 1 | 0 | 1 | 1 | Increment (CW) |
| 1 | 1 | 1 | 1 | No Change |

The output of the step counter 74 corresponds to a valid rest position of the stepper motor 30. The interval counter 72 is monitored by the microprocessor 16' via signal bus 73 which applies a reset signal thereto via signal bus 75.

Because there is a possibility that the carriage 10 upon which the print head 12 is mounted may be jostled or otherwise moved from its last valid print position upon an "alert" condition being sensed, the microprocessor 16' is operable in conjunction with a dynamic buffer 76 and an alert position buffer 78 to determine any change of position or "delta" from the last valid driven rest position and thereafter reposition the print head carriage 10 by activation of the stepper motor 30 (FIG. 1) in the proper direction. Upon an "alert" condition, the alert position buffer 78 operates to store the immediate carriage position upon receiving a read/store command from the microprocessor 16' via signal bus 77 which immediately stores the position information contained in the dynamic buffer 76. This positional information is further fed back to the microprocessor 16' via signal bus 79. When the "alert" condition is no longer present, the stored positional information applied to the microprocessor 16' is compared with the current carriage position information which appears on the signal bus 80 from the dynamic buffer 76 to the microprocessor 16'. If there is any error value between the two positional values, the microprocessor will activate the stepper motor 30 (FIG. 1) to move the carriage 10 until the "delta" is reduced to zero. The step counter 74 is likewise incremented or decremented under microprocessor control via signal bus 81.

Accordingly, what has been shown and described is a position tracker system which makes it not only possible but practical to operate dot matrix print head carriage printers in a mechanically hostile environment with minimal impact on printing operation.

Having thus shown and described what is at present considered to be the preferred embodiment of the invention, it should be noted that the same has been made by way of illustration and not limitation. Accordingly, all alterations, modifications and changes coming within the spirit and scope of invention as set forth in the appended claims are herein meant to be included.

I claim:

1. Apparatus for determining the position and direction of print head carriage movement of an impact type printer, comprising:
   drive motor means having a rotatable shaft coupled to a moveable carriage containing a print head;
   a timing wheel mounted on said shaft, said timing wheel further including a single set of circumferentially equally spaced apertures having a mutual arcuate separation substantially equal to the arcuate distance across said apertures, said arcuate distance further being capable of framing pairs of photo emitter/sensor elements arranged side by side;
   a pair of photo emitter elements arranged side by side adjacent said apertures on one side of said timing wheel;
   a pair of photo sensor elements arranged side by side adjacent said apertures on the other side of said timing wheel and being in registration with said pair of emitter elements so that each emitter element directs a light beam toward a respective sensor element; and
   means coupled to and being responsive to said pair of photo sensor elements for tracking a change of position from a last intentionally driven rest position in the presence of external forces applied such as shock and vibration and activating the drive motor means to return to said last driven rest position.

2. The apparatus as defined by claim 1 wherein said drive motor means comprises a stepper motor having discrete number of rest positions and accordingly rotational steps of said shaft and wherein said set of equally spaced apertures is equal in number to said rotational steps of said shaft.

3. The apparatus as defined by claim 2 wherein each aperture frames said pairs of photo/emitter sensor elements at said discrete rest or step position.

4. The apparatus as defined by claim 3 wherein said apertures are in the form of slots of like configuration having a slot width measured in the arcuate direction and being capable of framing said pair of photo/emitter sensor elements.

5. The apparatus as defined by claim 4 wherein said slots comprise generally rectangular slots whose relatively longer dimension extends along the timing wheel radius.

6. The apparatus as defined by claim 5 and additionally including a housing enveloping the outer edge of said timing wheel and including means for supporting said pairs of photo emitter/sensor elements in registration with said slots.

7. The apparatus as defined by claim 3 wherein the means for tracking a change of position further comprises digital logic circuit means and a stepper motor control unit coupled thereto, said logic circuit means being responsive to the respective outputs of said pair of sensor elements to generate carriage position information signals which are coupled to said control unit, said control unit further being responsive to said position information signals and being operable to generate stepper motor actuating signals.

8. The apparatus as defined by claim 7 wherein said logic circuit means includes means for detecting and storing the sequence of successive pairs of outputs of said pair of sensor elements, means for comparing said successive pairs of outputs and generating either a counter increment or a counter decrement signal, and digital counter means coupled to said counter signal and being operable to generate said carriage position information signals.

9. The apparatus as defined by claim 8 wherein said control unit is responsive to said position information signals and is operable to generate stepper actuating signals for repositioning the carriage in the event that an external force such as shock and/or vibration causes the carriage to erroneously change position from a known rest position.

10. The apparatus as defined by claim 9 and wherein said delta tracking means further comprises first memory means responsive to said carriage position information signals for storing the carriage position signal of the current position, second memory means controlled by said control unit for storing the carriage position signal when said external force changes the position of the carriage, and means coupled to said first and second memory means for comparing said carriage position signals and generating an error signal, said control unit being operable in response to said error signal for repositioning said carriage to the last valid driven rest position.

11. The apparatus as defined by claim 10 wherein said control unit comprises a microprocessor.

* * * * *